US009113055B2

(12) United States Patent
Sasaki

(10) Patent No.: US 9,113,055 B2
(45) Date of Patent: *Aug. 18, 2015

(54) IMAGE CAPTURING APPARATUS AUTOMATICALLY CAPTURING SUB IMAGE DATA

(71) Applicants: SONY CORPORATION, Tokyo (JP); SONY MOBILE COMMUNICATIONS INC., Tokyo (JP)

(72) Inventor: Keiko Sasaki, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,987

(22) Filed: Sep. 26, 2014

(65) Prior Publication Data

US 2015/0009365 A1    Jan. 8, 2015

Related U.S. Application Data

(63) Continuation of application No. 12/424,626, filed on Apr. 16, 2009, now Pat. No. 8,902,331.

(30) Foreign Application Priority Data

Apr. 18, 2008  (JP) ................. 2008-109274

(51) Int. Cl.
*H04N 5/76* (2006.01)
*H04N 1/21* (2006.01)

(52) U.S. Cl.
CPC ........... *H04N 1/2125* (2013.01); *H04N 1/2112* (2013.01); *H04N 1/2158* (2013.01); *H04N 2201/212* (2013.01); *H04N 2201/216* (2013.01)

(58) Field of Classification Search
USPC .......... 348/231.3, 231.2, 231.7–231.9, 231.1, 348/333.02
See application file for complete search history.

(56) References Cited

U.S. PATENT DOCUMENTS 5,978,016 A * 11/1999 Lourette et al. ................. 348/64
6,137,534 A * 10/2000 Anderson ................. 348/222.1
6,839,068 B2 * 1/2005 Yoshioka ...................... 345/670

(Continued)

FOREIGN PATENT DOCUMENTS

JP   2002-016865    1/2002
JP   2003-111012    4/2003

(Continued)

OTHER PUBLICATIONS

Japanese Office Action dated May 15, 2012.

*Primary Examiner* — Ahmed A Berhan
(74) *Attorney, Agent, or Firm* — Frommer Lawrence & Haug LLP; William S. Frommer

(57) ABSTRACT

An image capturing apparatus is disclosed. An image capturing section captures an image of light and obtains image data. An image display section displays the image data obtained by the image capturing section with a predetermined number of pixels. A storage section stores the image data obtained by the image capturing section. An interface section is connectable to an external storage device. A control section causes the image data obtained by the image capturing section to be stored to the external storage device connected through the interface section, when the captured image data are stored to the external storage device, the image data whose number of pixel exceeds the predetermined number of pixels to be converted into image data having the predetermined number of pixels, and the converted image data to be stored to the storage section.

1 Claim, 2 Drawing Sheets

(56) References Cited

U.S. PATENT DOCUMENTS

| | | | |
|---|---|---|---|
| 2002/0021359 A1 | 2/2002 | Okamoto | |
| 2003/0090497 A1 | 5/2003 | Yoshioka | |
| 2003/0174219 A1 | 9/2003 | Iijima | |
| 2004/0018014 A1 | 1/2004 | Doi | |
| 2004/0116167 A1 | 6/2004 | Okuzaku et al. | |
| 2005/0146631 A1 | 7/2005 | Shelton et al. | |
| 2007/0015550 A1 | 1/2007 | Kayanuma | |

FOREIGN PATENT DOCUMENTS

| | | |
|---|---|---|
| JP | 2003-274341 | 9/2003 |
| JP | 2007-274661 | 10/2007 |
| JP | 2008-54128 | 3/2008 |
| WO | WO 99/03263 | 1/1999 |

\* cited by examiner

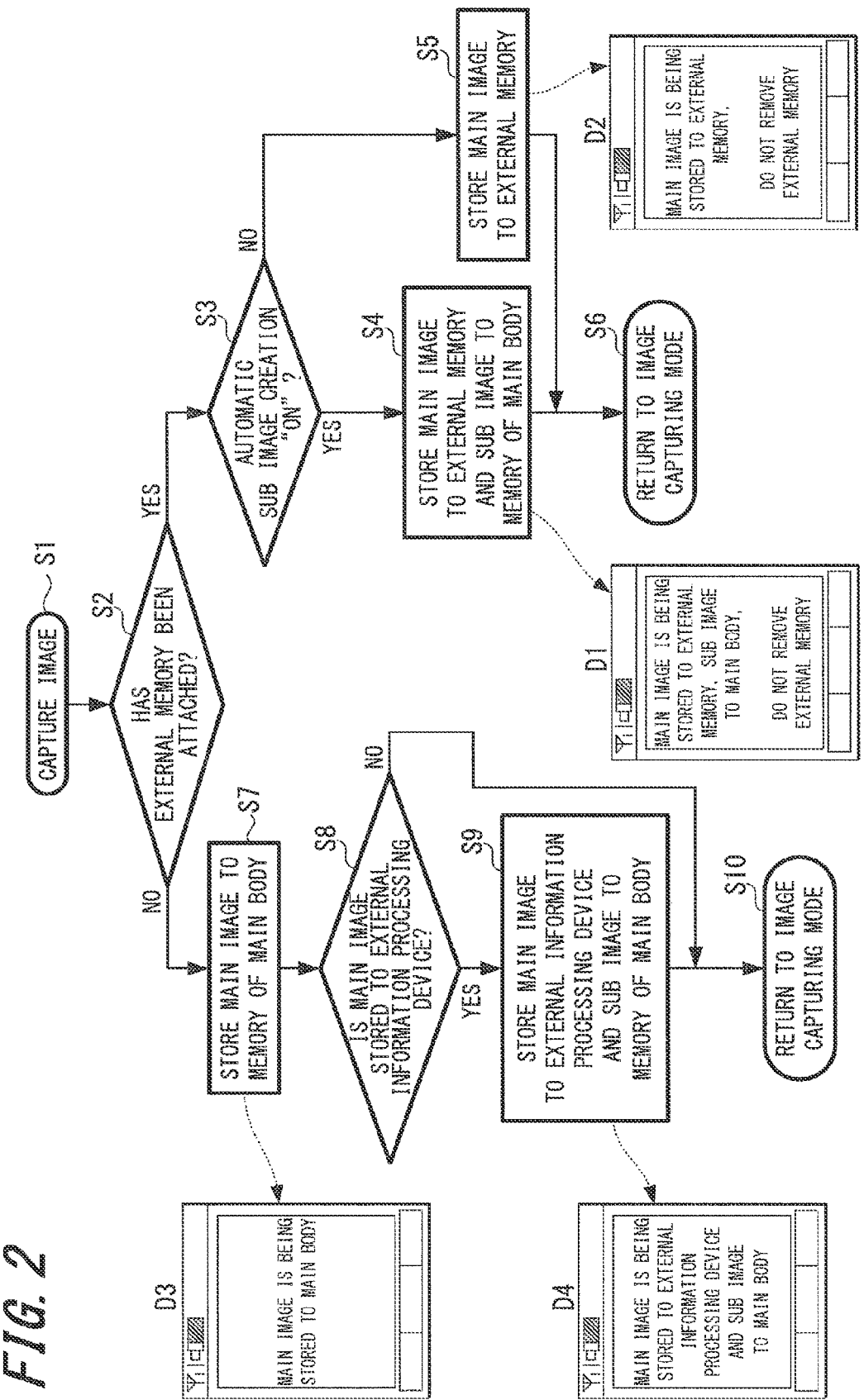

IMAGE CAPTURING APPARATUS AUTOMATICALLY CAPTURING SUB IMAGE DATA

This is a continuation of application Ser. No. 12/424,626, filed Apr. 16, 2009, which is entitled to the priority filing date of Japanese application no. 2008-109274, filed on Apr. 18, 2008, the entirety of which is incorporated herein by reference.

BACKGROUND OF THE INVENTION

1. Field of the Invention

The present invention relates to an image capturing apparatus suitably applicable, for example, for a mobile phone terminal device with a built-in camera, more specifically, to an image capturing apparatus having a function of storing data of captured image to an external memory.

2. Description of the Related Art

At present, many mobile phone terminal devices are provided with a picture (image) capturing function. The image capturing function has various image capturing modes. Among them, there is a mode mainly for which an image is displayed on a screen of a personal computer or the like and/or pictures are printed (this image capturing mode is called a digital-camera mode). In this digital-camera mode, images having various sizes can be captured. For example, many mobile phone terminal devices can capture wide-angle images and panorama images as well as images having the same aspect ratio as that of a liquid crystal display screen having the size according to the video graphics array (VGA) (640 pixels×480 pixels) (hereinafter, this size is referred to as the VGA size).

Since the data amount of an image captured in the digital-camera mode is large (e.g. 0.3 MB or greater), an external memory medium that stores captured images is directly attached to such a mobile phone terminal device. An external memory medium typically used for such a mobile phone terminal device is a flash memory card.

In an image capturing apparatus, such as a digital camera, since the data amounts of captured images are generally large, they are stored to an external memory medium such as a flash memory card (for example, see Japanese Unexamined Patent Application Publication No. 2008-54128).

SUMMARY OF THE INVENTION

In the foregoing image capturing apparatus such as a mobile phone terminal device with an image capturing function and a digital camera, when an image larger than the size of a display screen is captured, although data of the image are stored to an external memory medium, they are not stored to the main body of the image capturing apparatus.

In such an image capturing apparatus, when the user carries the image capturing apparatus around with him or her without the external memory medium attached, because the captured images have been stored in the external memory medium, he or she has no way to present captured images to others. In addition, to store a captured image to the internal memory of the image capturing apparatus, it is necessary to move or copy an image stored in the external memory medium to the internal memory of the image capturing apparatus. Thus, there was a problem that such an operation imposed some effort on the user.

In view of the foregoing, it would be desirable to provide an image capturing apparatus that is capable of storing a captured image not only to an external memory medium, but to a main body of an image capturing apparatus.

According to an embodiment of the present invention, there is provided an image capturing apparatus including an image capturing section, an image display section, a storage section, an interface section, and a control section. The image capturing section captures an image of light and obtain image data. The image display section displays the image data obtained by the image capturing section with a predetermined number of pixels. The storage section stores the image data obtained by the image capturing section. The interface section are connectable to an external storage device. The control section causes the image data obtained by the image capturing section to be stored to the external storage device connected through the interface section, when the captured image data are stored to the external storage device, the image data whose number of pixel exceeds the predetermined number of pixels to be converted into image data having the predetermined number of pixels, and the converted image data to be stored to the storage section.

In the image capturing apparatus according to an embodiment of the present invention, when image data captured by the image capturing section are stored to the external storage device, image data whose number of pixels has been converted into the number of pixels corresponding to the size of the display screen are automatically created under the control of the control section. The converted image data are stored to the internal storage section of the image capturing apparatus. In other words, the image capturing apparatus according to an embodiment of the present invention has a backup function of automatically storing an image whose number of pixels has been converted into that of the size of the display screen to the internal storage section of the image capturing apparatus after an image captured by the image capturing section is stored to the external storage device As described above, in the image capturing apparatus according to an embodiment of the present invention, an image captured and obtained by the image capturing section is stored to the external storage device. At that point, image data whose number of pixels has been converted into a predetermined number of pixels (the number of pixels of the display screen) are automatically created. The converted image data are stored to the main body of the image capturing apparatus. Thus, according to an embodiment of the present invention, image data captured and obtained by the image capturing section can be easily converted into image data having a size and a data amount suitable for the image display section of the image capturing apparatus and left in the image capturing apparatus. In addition, according to an embodiment of the present invention, even if the external storage medium has been removed from the image capturing apparatus, image data can be satisfactorily stored to the image capturing apparatus. Thus, the user can carry a large number of captured images around with him or her.

BRIEF DESCRIPTION OF THE DRAWINGS

The invention will become more fully understood from the following detailed description, taken in conjunction with the accompanying drawings, wherein similar reference numerals denote corresponding elements, in which:

FIG. 2 is a flowchart showing a procedure of a storage process for a captured image according to an embodiment of the present invention.

DETAILED DESCRIPTION OF THE PREFERRED EMBODIMENTS

Figure 1:
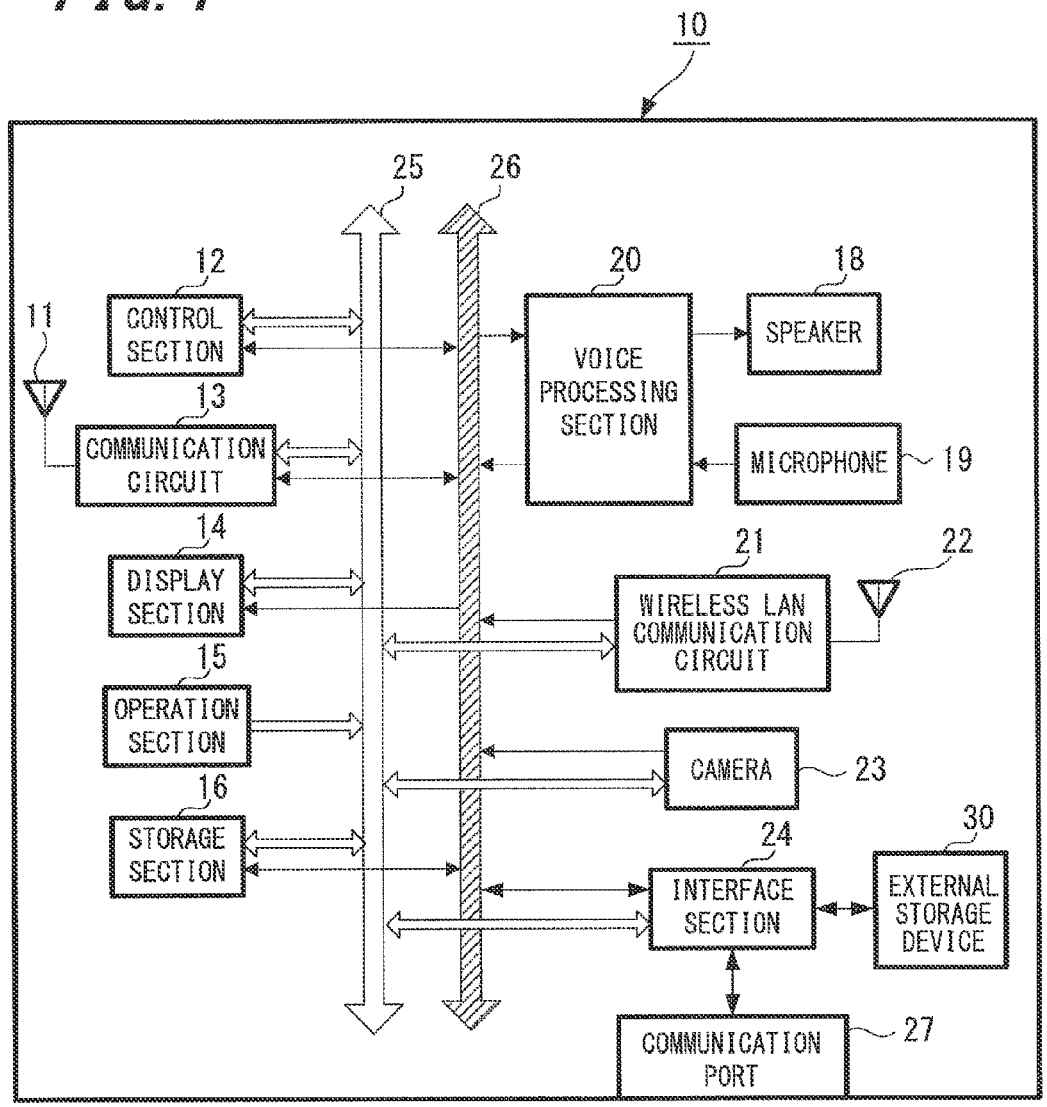
FIG. 1 is an outlined block diagram showing a mobile communication terminal device according to an embodiment of the present invention.

Next, with reference to the accompanying drawings, an embodiment of the present invention will be described.
[Structure of Image Capturing Apparatus]

In this embodiment, for example, a mobile communication terminal device having an image capturing function as an image capturing apparatus will be described. In this embodiment, the mobile communication terminal device is a so-called mobile telephone terminal that wirelessly communicates with a base station for wireless telephones.

FIG. 1 is an outlined block diagram showing a mobile communication terminal device according to this embodiment of the present invention. As shown in FIG. 1, the mobile communication terminal device designated by reference numeral 10 includes an antenna 11, a control section 12, a communication circuit 13 connected to the antenna 11, a display section 14, an operation section 15, and a storage section 16. The mobile communication terminal device 10 also includes a speaker 18 that outputs a communication voice, a microphone 19 that collects a communication voice, and a voice processing section 20 that converts communication voice data from digital data to analog data or vice versa. The mobile communication terminal device 10 also includes a wireless LAN communication circuit 21 and a wireless LAN antenna 22.

The mobile communication terminal device 10 also includes a camera 23 and an interface section 24.

As shown in FIG. 1, the mobile communication terminal device 10 also includes a control line 25 and a data line 26. The control line 25 is a signal line through which signals that control each section of the mobile communication terminal device 10 flow. As shown in FIG. 1, several sections of the mobile communication terminal device 10 are connected to the control section 12 through the control line 25. The individual sections are processed under the control of the control section 12. On the other hand, the data line 26 is a signal line through which data are transferred between sections connected thereto. The mobile communication terminal device 10 also includes a power supply section (not shown). The power supply section supplies electricity to each section of the mobile communication terminal device 10.

The control section 12 includes an arithmetic control unit such as a central processing unit (CPU) and controls each section of the mobile communication terminal device 10.

The communication circuit 13 transmits through the antenna 11 a transmission signal to a mobile phone base station (not shown) and receives a reception signal therefrom under the control of the control section 12. The communication circuit 13 also modulates and demodulates a radio wave transmitted to and received from the mobile phone base station. The wireless LAN communication circuit 21 modulates and demodulates a radio wave according to predetermined modulation/demodulation systems under the control of the control section 12 and transmits and receives a radio signal to and from an external access point device (not shown) through the wireless LAN antenna 22.

The display section 14 (image display section) is composed of a liquid crystal display (LCD) or the like. In this embodiment, the screen size of the liquid crystal display is 640 pixels×480 pixels (VGA size). In this embodiment, the screen size of 640 pixels×480 pixels may be full screen size the full screen size or the size of an area in which a captured image is displayed. When the full screen size is larger than the size of the area in which an image is displayed, an area for additional information is disposed around the area for the image.

The operation section 15 includes a jog dial, a key pad, and so forth. With the operation section 15, the user can input a telephone number, mail text, and so forth. In addition, with the operation section 15, the user can perform an image capturing operation and a mode setting operation of the camera 23.

The storage section 16 is composed of a nonvolatile memory such as a flash memory (semiconductor memory). The storage section 16 stores various types of data such as a telephone directory, a schedule, mail messages, moving images, still images, music, application software, bookmarks, and web pages, and computer programs.

In addition, the storage section 16 has a data folder (image storage section) dedicated to store image data (sub image) created by decreasing the number of pixels of image data (main image) that are captured and output by the camera 23 (number-of-pixels conversion process).

The image size (number of pixels) of a main image is designated by a user's operation. Although details of the number of pixels of a sub image will be described later, when the number of pixels is converted, the size of a sub image is converted into the screen size (640 pixels×480 pixels, VGA size) of the display section. However, when the image size of a main image is the same as or smaller than the VGA size, the image size of the main image is not changed, namely the number of pixels of the main image is not converted. Likewise, when the aspect ratio of a main image is special (namely, the aspect ration is not 4:3), the number of pixels of the main image is not converted.

The camera 23 (image capturing section) includes an image sensor, a lens mechanism that transmits incident light of an object to the image sensor, and a captured image signal processing section that processes the image signal obtained by the image sensor and outputs the processed signal. The camera 23 can capture images having various sizes.

In addition, the mobile communication terminal device 10 is connected to an external storage device 30 attached to a card slot (not shown) of the mobile communication terminal device 10 through the interface section 24. In other words, data can be transferred between the mobile communication terminal device 10 and the external storage device 30 through the interface section 24. In this embodiment, as the external storage device 30 that stores data of an image (main image) captured by the camera 23 (hereinafter, the external storage device 30 is referred to as the external memory 30), a flash memory card is used.

In addition, the interface section 24 is connected to a communication port 27. The mobile communication terminal device can be connected to an information processing device (a personal computer, an external hard disk, or the like) through the communication port 27. When the mobile communication terminal device 10 is connected to an external information processing device through the communication port 27, image data stored in the storage section 16 of the mobile communication terminal device 10 can be transferred to the external information processing device. The external information processing device and the communication port 27 are connected through a predetermined communication cable such as a universal serial bus (USB) cable.

In the mobile communication terminal device 10 of this embodiment, when the external memory 30 has been selected as a storage device in the state that the external memory 30 has been attached to the mobile communication terminal device 10, image data (main image) of an image captured by the camera 23 are stored to the external memory 30 without changing the size of the image data. At this point, a sub image is automatically created in such a manner that the size (number of pixels) of the main image is converted into the size of the display screen of the display section 14 and data of the sub image are stored to a sub image storage folder (image storage section).

In the mobile communication terminal device 10 of this embodiment, when data of a main image captured by the camera 23 are stored to the external memory 30, a sub image corresponding to the main image is backed up to the main body of the mobile communication terminal device 10. The main image and sub image storage processes are performed under the control of the control section 12. The reason why a sub image is stored in the size of the display screen is in that an adequate image quality is secured when the sub image is displayed in the full size of the display screen (the image quality of the sub image is prevented from being deteriorated).

The foregoing sub image creation and storage processes are performed in an image capturing mode in which an image is displayed on a large screen, for example, of a personal computer and an image is printed, namely a so-called digital-camera mode. Thus, in an image capturing mode in which an image for a standby screen is captured (this image capturing mode is called a wallpaper mode) and an image capturing mode in which a moving image is captured (this image capturing mode is called a movie mode), the sub image creation and storage processes are not performed.

Table 1 shows an example of the relationship of data sizes of main images and those of sub images corresponding thereto of the mobile communication terminal device 10 according to this embodiment.

TABLE 1

| Sizes of main images | Sizes of sub images |
|---|---|
| 0.3 MB (640 × 480) | 0.3 MB (640 × 480) |
| 1 MB (1280 × 960) | |
| 2 MB (1632 × 1224) | |
| 3 MB (2048 × 1536) | |
| 5 MB (2592 × 1944) | |
| 2 MB (wide: 1920 × 1080) | 2 MB (wide: 1920 × 1080) |
| Panorama (2592 × 960) | Panorama (2592 × 960) |

As shown in Table 1, the sizes of sub images corresponding to main images having the same aspect ratio as that of the display screen according to the VGA standard are all 640 pixels ×480 pixels (0.3 MB). On the other hand, for wide angle images and panorama images (those having different aspect ratios from that of the display screen according to the VGA standard), sub images that have the same sizes as those of the main images are created. This is because when an image having an aspect ratio different from that of the display screen is stored in the size of 640 pixels×480 pixels, since part of the image is cut on both lateral sides, there is a risk of which an important image portion is erased. The sizes of sub images are not limited to those in the example shown in Table 1, but the user can change them when necessary.

[Storage Process of Captured Images]

Next, with reference to FIG. 2, a storage process for captured images according to this embodiment will be specifically described. FIG. 2 is a flowchart showing a procedure of a storage process for captured images according to this embodiment. FIG. 2 shows examples of messages (D1 to D4 in FIG. 2) displayed on a display screen (liquid crystal display) of the display section 14 when a captured image is stored (in steps S4, S5, S7, and S9).

First, the mobile communication terminal device 10 is placed in the image capturing mode and an image is captured (at step S1 in FIG. 2). At this point, a main image is captured in any of the sizes (a size greater than 640 pixels×480 pixels) shown in Table 1. Thereafter, it is determined whether or not the external memory 30 (flash memory card) has been attached to the mobile communication terminal device 10 (at step S2 in FIG. 2).

When the external memory 30 has been attached to the mobile communication terminal device 10, the determined result at step S2 becomes Yes and the flow advances to step S3. At step S3, it is determined whether or not to automatically create a sub image corresponding to the main image captured by the camera 23. The automatic sub image creation "ON" or "OFF" state is pre-set on the monitor screen before a main image is captured.

When the automatic sub image creation setting is in the "ON" state at step S3, the determined result at step S3 becomes Yes. In this case, the main image captured by the camera 23 is stored to the external memory 30 without changing the number of pixels. In addition, a sub image corresponding to the main image is automatically created and stored to the sub image storage holder of the storage section 16 (at step S4 in FIG. 2). At this point, as represented by the screen D1 shown in FIG. 2, a message indicating that the main image will be stored to the external memory 30 and the sub image will be stored to the main body of the mobile communication terminal device 10 is displayed. After the main image and the sub image are stored, the mode returns to the image capturing mode (at step S6).

When the process is performed at step S4, if the storage section 16 of the mobile communication terminal device 10 does not have an enough space or has stored a maximum number of files it can store, unnecessary data are deleted from the storage section 16 so as to secure a storage space for sub images.

If an interrupt such as a voice incoming call occurs while the main image and the sum image are being stored at step S4, although the storage process for the main image to the external memory 30 is continued, the storage process for the sub image to the main body of the mobile communication terminal device 10 is cancelled.

In contrast, when the automatic sub image creation setting is in the "OFF" state at step S3, the main image captured by the camera 23 is stored to the external memory 30 (at step S5 in FIG. 2). At this point, as represented by the screen D2 in FIG. 2, a message that indicates that the main image will be stored to the external memory 30 is displayed on the display screen of the display section 14. After the main image is stored, the mode returns to the image capturing mode (at step S6).

Thereafter, returning to step S2, a process performed in the case that the determined result at step S2 is No (when the external memory 30 has not been attached to the mobile communication terminal device 10) (a left-side flow in FIG. 2 (steps S7 to S10)) will be described.

In the following, an example of a process of storing a main image that has been temporarily stored in the main body of the mobile communication terminal device 10 to an external information processing device such as a personal computer or an external hard disk (not shown) will be described. In this case, it is assumed that the mobile communication terminal device 10 and the external information processing device have been connected through a communication cable such as a USB cable. In addition, in the following process, it is assumed that the automatic sub image creation setting is in the "ON" state.

When the determined result at step S2 is "No", the main image captured by the camera 23 is stored to the storage section of the mobile communication terminal device 10, but a sub image is not created (at step S7 in FIG. 2). At this point, as represented by the screen D3 in FIG. 2, a message that indicates that the main image will be stored to the main body of the mobile communication terminal device 10 is displayed on the display screen of the display section 14.

Thereafter, it is determined whether or not to store (move or copy) the main image stored in the storage section 16 of the mobile communication terminal device 10 to an external information processing device (at step S8 in FIG. 2). When the main image is stored to the external information processing device (the determined result at step S8 is Yes), the main image is stored to a storage section of the external information processing device through the interface section 24. When the main image is stored, a sub image is automatically created and the sub image is stored to the sub image storage folder of the storage section 16 (at step S9 in FIG. 2). At this point, as represented by the screen D4 in FIG. 2, a message that indicates that the main image will be stored to the external information processing device and the sub image will be stored to the main body of the mobile communication terminal device 10 will be displayed on the display screen of the display section 14. However, when the main image is moved to the storage section of the external information processing device at step S9, the image data of the main image stored in the storage section 16 of the mobile communication terminal device 10 are deleted.

At step S9, only when the main image is moved to the external information processing device, data of the sub image may be stored. When the main image is copied to the external image processing device, data of the sub image may not be stored.

After the main image and sub image storage processes are completed at step S9, the mode returns to the image capturing mode (at step S10).

On the other hand, when the determined result at step S8 is No (when the main image is not stored to the external information processing device), the mode returns to the image capturing mode (at step S10).

In this embodiment, as described above, a sub image corresponding to a main image captured by the camera 23 is created and stored to the main body of the mobile communication terminal device 10.

In the foregoing example, in steps S7 to S9 in FIG. 2, data of a main image are stored to an external information processing device such as a personal computer or an external hard disk. Instead, for example, after a main image is stored to the storage section 16 of the mobile communication terminal device 10 at step S7, the external memory 30 such as a flush memory card may be attached to the mobile communication terminal device 10 such that the main image is stored to the external memory 30. In this case, when the main image is stored to the external memory 30, a sub image corresponding to the main image is created and stored in the sub image storage holder of the storage section 16.

As described above, when a main image is stored to the external memory 30 or an external information processing device, a sub image corresponding to the main image can be automatically created and stored to the main body of the mobile communication terminal device 10. Thus, in this embodiment, a sub image corresponding to a main image captured by the camera 23 can be easily left in the main body of the mobile communication terminal device 10. Thus, the user can be urged to leave his or her many memories in the mobile communication terminal device 10. In addition, even if the mobile communication terminal device 10 is not provided with the external memory 30 (or the external memory 30 has not been attached to the mobile communication terminal device 10), the user can carry many captured images around with him or her.

In the mobile communication terminal device 10 of this embodiment, the storage section 16 is provided with the sub image data folder (image storage section). With the sub image storage holder, sub images can be managed separately from main images and easily edited independently from main images.

As an example of the image capturing apparatus according to the following embodiment of the present invention, a mobile communication terminal device was described. However, another embodiment of the present invention may be applied to any image capturing apparatus having a photographing function, an image display function, and an image storage function. For example, an embodiment of the present invention may be applied to a digital camera.

In the foregoing embodiment, the display screen of the display section has the size according to the VGA standard. Another embodiment of the present invention may be applied to an image capturing apparatus whose display screen has any size, for example, the size according to the quarter video graphic array (QUGA) standard.

The present application contains subject matter related to that disclosed in Japanese Priority Patent Application JP 2008-109274 filed in the Japan Patent Office on Apr. 18, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. An image capturing apparatus, comprising:
an image capturing section configured to capture an image of light and obtain image data having a first predetermined number of pixels;
an image display section configured to display the image data, obtained by the image capturing section, with a second predetermined number of pixels;
a storage section configured to store the image data, having the first predetermined number of pixels obtained by the image capturing section, when no external storage device is connected;
an interface section configured to be connectable to the external storage device; and
a control section configured to cause the image data having the first predetermined number of pixels obtained by the image capturing section to be stored to the external storage device connected through the interface section, and after the captured image data are stored to the external storage device, if an automatic sub image creation state is turned on, the control section configured to automatically convert the image data to the second predetermined number of pixels, and to automatically (a) delete the image data having the first predetermined number of pixels from the storage section, (b) store the converted image data to the storage section, and (c) display a message indicating storage of image data in the external storage device and the converted image data in the storage section.

* * * * *